United States Patent [19]
Takahashi et al.

[11] 4,434,081
[45] Feb. 28, 1984

[54] TITANIUM TRICHLORIDE CATALYTIC COMPONENT AND HOMO- OR CO-POLYMERIZATION OF α-OLEFIN

[75] Inventors: Yoshikazu Takahashi, Hikari; Yoichi Sunada, Shinnanyo; Toshiharu Tokuhara, Tokuyama; Masaru Takitani, Shinnanyo, all of Japan

[73] Assignee: Toyo Stauffer Chemical Co., Ltd., Tokyo, Japan

[21] Appl. No.: 234,403

[22] Filed: Feb. 13, 1981

[30] Foreign Application Priority Data

Feb. 13, 1980 [JP] Japan .................................. 55/16419

[51] Int. Cl.³ .............................................. C08F 4/64
[52] U.S. Cl. ..................................... 502/154; 526/142; 502/156; 502/169; 502/227
[58] Field of Search ...................................... 252/429 B

[56] References Cited

U.S. PATENT DOCUMENTS 3,278,511  10/1966  Langer ................... 252/429 B X
3,984,350  10/1976  Karayannis et al. ............ 252/429 B
4,210,738   7/1980  Hermans et al. ........... 252/429 B X

FOREIGN PATENT DOCUMENTS 1484086  8/1977  United Kingdom ............ 252/429 B

*Primary Examiner*—Patrick Garvin
*Attorney, Agent, or Firm*—Armstrong, Nikaido, Marmelstein & Kubovcik

[57] ABSTRACT

Titanium trichloride catalytic component and homo- or co-polymerization of α-olefin by employing the titanium trichloride catalytic component combined with organic aluminium compound, wherein the titanium trichloride catalytic component is prepared by a process comprising the following steps:

first step: reducing titanium tetrachloride with an organo-aluminum compound second step: treating the resultant reduced solid, which is obtained by the first step, with organic ether compound third step: reacting the treated solid, which is obtained by the second step, with titanium tetrachloride and whose objects lie in producing polymer of high stereo-regularity advantageously by carrying out reaction of the first step in a single solvent of aromatic compound or a mixed solvent of aliphatic hydrocarbon and aromatic compound.

1 Claim, No Drawings

TITANIUM TRICHLORIDE CATALYTIC COMPONENT AND HOMO- OR CO-POLYMERIZATION OF α-OLEFIN

DETAILED DESCRIPTION OF THE INVENTION

This invention relates to a titanium trichloride catalytic component of high activity whereby α-olefin polymer having high stereo-regularity can be advantageously produced and relates to the homo- or co-polymerization of α-olefins whereby α-olefin polymers can be advantageously produced in the presence of the titanium trichloride catalytic component and an organoaluminum compound.

More particularly, this invention relates to a titanium trichloride catalytic component obtained by steps comprising a step of reducing titanium tetrachloride with an organoaluminum compound represented by the general formula of $AlRnX_{3-n}$ (wherein R represents hydrocarbon radical containing 1-18 carbon atoms, X represents halogen atom and n is an optional number represented by the formula of $0 < n \leq 3$) in a single solvent of a aromatic compound or a mixed solvent of an aliphatic hydrocarbon compound and an aromatic compound, a step of subsequently treating the resulting reduced solid with an organic ether compound and a step of reacting the treated solid with titanium tetrachloride, and relates to a homo- or co-polymerization process in the presence of catalyst system prepared by combining the titanium trichloride catalytic component with an organic aluminum compound.

That is to say, this invention has characteristics in that a polymer of high stereo-regularity can be obtained in a high yield by using the resulting titanium trichloride catalytic component, together with the particle diameter of the resulting titanium trichloride catalytic component being highly uniform and the average particle diameter thereof being freely controllable, without diminishing properties, which the resulting polymer posesses, for example high bulk density thereof.

It has been proposed by Japan examined patent publication No. sho 53-3356 etc. that after treating β-type titanium trichloride, obtained by reducing titanium tetrachloride with an organoaluminum compound at low temperature, with an organic ether compound, titanium trichloride catalytic component can be produced by converting its crystal type from β-type to γ-type, together with reacting it with titanium tetrachloride. It is a generally known fact that a polymer of high stereo-regularity can be produced in high yield in case of polymerizing α-olefin in the presence of a catalyst prepared by combining said titanium trichloride catalytic component with an organoaluminum compound.

In case of preparing titanium trichloride catalytic component by the method proposed in Japanese examined patent publication No. Sho 53-3356 etc., the average particle diameter of titanium trichloride catalytic component obtained is generally 25–35μ, and in case of using said titanium trichloride catalytic component for polymerization of α-olefin, the particle diameter of resulting polymer becomes large, on account of high activity of said titanium trichloride catalytic component. Accordingly, a polymer of large particle diameter can be obtained so that a pelletizing process, whose object is in forming the resulting polymer in granule, can be omitted, although depending on polymerization process thereof.

On the other hand, apparatus for preparing α-olefin polymer designed so as to use conventional titanium trichloride catalytic component, which has been generally used, that is to say, powder-like titanium trichloride catalytic component which is obtained by activating solid product, obtained by reducing titanium tetrachloride with metallic aluminum, through means of crushing said solid product or other means, it was designed so as to handle powder-like polymer, because resulting α-olefin has been also powder-like. Accordingly, in case that the aforesaid titanium trichloride catalytic component of high activity is employed in such apparatus, operation-troubles by the reason of difficulties in transforming resulting polymer from one process to another process in processes for producing polymer frequently occur.

If it is possible to freely control the average particle diameter of a titanium trichloride catalytic component without diminishing the characteristics that a polymer of high stereo-regularity can be obtained in a high yield by using said titanium trichloride catalytic component, the contribution of this process to industry relating to the production of α-olefin polymer is very large, because this process can be applied to many kinds of process ranging from the conventional process designed so as to use powder-like titanium trichloride catalytic component to the conventional process in which a pelletizing process of the polymer is omitted.

As methods for controlling the average particle diameter of the titanium trichloride catalytic component, it is possible to control the average particle diameter of the resulting titanium trichloride catalytic component by selecting operating conditions of the reducing reaction when titanium tetrachloride is reduced with an organoaluminum compound in solvent of, for example, aliphatic hydrocarbon compound etc., but the range of controllable particle diameter is narrow, so that it cannot be the decisive means of achieving the above object.

The inventors have studied these problems and have found the following points to reach this invention.

This invention is characterized in that the reduction of titanium tetrachloride with an organoaluminum compound is carried out in a single solvent or a mixed solvent, wherein the average particle diameter of the resulting titanium trichloride catalytic component can be freely controlled in the range of 1–40μ and, concurrently, polymer of high stereo-regularity can be produced in high yield when polymerizing α-olefin by employing said titanium trichloride catalytic component.

Details of this invention are explained as follows.

The aromatic compounds employed in this invention are both aromatic hydrocarbons and halogenated aromatic hydrocarbons, which are preferred to be in a liquid state over the necessary range of temperature, like aliphatic hydrocarbons, for enforcing this invention.

As the aromatic hydrocarbons, benzene and toluene and xylene are employed, and as the halogenated aromatic hydrocarbons, chlorobenzene, chlorotoluene and chloroxylene etc. are employed. As the aliphatic hydrocarbons, n-hexane, n-heptane, n-octane, n-dodecane and liquid paraffin etc. are employed.

The mixing ratio of the mixed solvent employed in this invention is optional and the average particle diameter of the resulting titanium trichloride catalytic component is variable by the mixing ratio value.

If toluene is selected as said aromatic hydrocarbon, appearance of variation in the average particle diameter can be explained as follows.

As explained in the examples of this specification, it is understood that a smaller average particle diameter of the titanium trichloride catalytic component can be obtained, as the mixing ratio of the aromatic hydrocarbon compound to the aliphatic hydrocarbon compound is increased.

The amount of titanium tetrachloride dissolved in the mixed solvent and the single solvent is not particularly limited, but is general, from the standpoint of both operativity and productivity for producing the titanium trichloride catalytic component, titanium tetrachloride in the range of 0.01–5 mols per 1 liter of the single solvent or the mixed solvent is dissolved therein.

If titanium tetrachloride of over 5 moles per 1 liter of the single solvent or mixed solvent is dissolved therein, concentration of the resulting slurry becomes high to encounter difficulties in stirring thereof, when the titanium trichloride is formed. On the contrary, if it is less than 0.01 mol, the amount of resulting titanium trichloride is too little and lowers the productivity.

The organoaluminum compounds employed as reducing agent for reducing titanium tetrachloride are represented by the general formula $AlR_nX_{3-n}$ (R is hydrocarbon radical of 1–18 carbon number. X is halogen atom, n is optional number in range of $0 < n \leq 3$).

To say concretely, trimethyl aluminum, triethyl aluminum, tri-n-propyl aluminum, tri-n-butyl aluminum, tri-isobutyl aluminum, tri-n-hexyl aluminum, tri-2-methylpentyl aluminum, tri-n-octyl aluminum, tri-n-decyl aluminum, dimethyl aluminum chloride, diethyl aluminum chloride, di-n-propyl aluminum chloride, di-isobutyl aluminum chloride, di-n-butyl aluminum chloride, methyl aluminum sesqui-chloride, ethyl aluminum sesqui-chloride, n-propyl aluminum sesqui-chloride, isobutyl aluminum sesqui-chloride, n-butyl aluminum sesqui-chloride, methyl aluminum dichloride, ethyl aluminum dichloride, n-propyl aluminum dichloride, isobutyl aluminum dichloride, n-butyl aluminum dichloride, diethyl aluminum fluoride, diethyl aluminum bromide, diethyl aluminum iodide etc. can be employed.

When titanium tetrachloride is reduced with the organoaluminum compound, the compound is usually added into the single solvent or mixed solvent of the reducing reaction as it is, or as a solution of 250–500 g per 1 liter of the single solvent or mixed solvent.

It is necessary and enough for the organoaluminum compound to be added in an equivalent amount for reducing the titanium tetrachloride to give titanium trichloride, but the compound can be added in an excess amount.

It is necessary that the temperature at the time of reducing the titanium tetrachloride be controlled between $-100°$ C. and $30°$ C., preferably between $-50°$ and $20°$ C., more particularly between $-10°$ C. and $5°$ C.

If the temperature is below $-100°$ C., the reducing reaction becomes slow, so that the reaction requires long time.

On the contrary, if the temperature is above $30°$ C., the titanium trichloride catalytic component having excellent properties cannot be obtained.

It is further desirable that the reacting system is aged at the same temperature for 0.1–5 hours to complete the reducing reaction, after addition of the organic aluminum chloride.

The reduced solid obtained from the reducing reaction, of which the main component is titanium trichloride, is then treated with an organic ether compound.

The organic ether compound, which can be employed in this invention, is a compound represented by a general formula of ROR' (wherein R and R' may be the same or different hydrocarbon radicals of carbon number 1–12, or cyclic organic ethers in which R and R' are linked.

To say concretely, aliphatic ethers such as diethyl ether, di-isopropyl ether, di-n-propyl ether, di-n-butyl ether, di-n-amyl ether, di-isoamyl ether, di-n-hexyl ether, di-n-octyl ether, di-n-decyl ether, di-n-dodecyl ether, n-amyl-n-butyl ether, n-amyl-isobutyl ether, n-butyl-n-propyl ether, n-butyl-isoamyl ether, n-propyl-n-hexyl ether, n-butyl-n-octyl ether etc, alicyclic ethers such as tetrahydrofuran and tetrahydropyran etc., and aromatic ether such as diphenyl ethers and anisol etc. can be exemplified, in particular di-n-butyl ether, di-n-amyl ether and di-isoamyl ether are preferably employed.

The treatment of the reduced solid with the organic ether compound can be carried out by means of heating a suspension of the reduced solid in the organic ether compound and so on. However, in general the reduced solid is treated by the addition and heating thereof in the above mentioned single solvent or mixed solvent in which the organic ether compound is dissolved.

On the other hand, it is ordinary that the amount of the employed organic ether compound is 0.5–1.75 mols per 1 mol of titanium trichloride contained in the reduced solid, and the temperature in the treatment is kept between $0°$ C. and $80°$ C.

The reduced solid obtained by reducing titanium tetrachloride with an organoaluminum compound at low temperature, whose main component is titanium trichloride having $\beta$-type crystal structure, does not vary in crystal structure, even if the reduced solid is treated with the organic ether compound. Moreover, the titanium trichloride of $\beta$-type has low polymerisation activity and gives low yield of stereo-regular polymer, so that it can not be practically used as the catalytic component for polymerisation of $\alpha$-olefins.

Accordingly, it is necessary that the crystal form of the reduced solid should be changed from $\beta$-type to $\gamma$-type or $\delta$-type.

As the changing method, it is usually carried out that the reduced solid is heat-treated in carbon tetrachloride, titanium tetrachloride or hydrocarbon compound dissolving 30–40 Vol. % of titanium tetrachloride. The treating condition is usually to heat it at the temperature of $40°$–$80°$ C. for 1–3 hours.

After changing the crystal form thereof from $\beta$-type to $\gamma$ or $\delta$-type by treatment with titanium tetrachloride etc, the treated solid is recovered by filtration or decantation, further washed with a hydrocarbon compound to remove adhering titanium tetrachloride etc., and dried to give the titanium trichloride catalytic component.

The titanium trichloride catalytic component obtained by the above processes is approximately spherical and has a particle diameter of excellent uniformity. The titanium trichloride catalytic component can be preserved in an inactive gas like nitrogen or in a state suspended in hydrocarbon.

The titanium trichloride catalytic component is combined with the organoaluminum compound, which is of the type employed in the foresaid reduction of titanium tetrachloride, to form a catalytic system for polymerization of α-olefins.

The mixing ratio of the titanium trichloride catalytic component and the organoaluminum compound in this case can be selected in wide range and is optionally decided by the concerned persons, but it is usually suitable that 1–20 mols of the organic aluminum compound is employed per 1 mol of the titanium trichloride.

In case of carrying out homo- or co-polymerization of an α-olefin in this invention, the electron donor agent, which is generally used, can be further combined with the catalytic system.

As the polymerization method in this invention, a suspension polymerization process in which an aromatic hydrocarbon compound such as benzene, toluene, xylene etc., aliphatic hydrocarbon compound such as hexane, heptane, octane etc. and alicyclic hydrocarbon compound such as cyclohexane, cycloheptane and methyl cyclohexane etc. are employed as solvent, a liquid phase polymerization process in which liquidized monomer is employed as solvent, or a gas phase polymerization process in which monomer exists in gaseous state can be used.

This invention is explained by examples as follows.

Furthermore, polymerization activity (a), heptane-insoluble ratio (H.I.), isotactic index (I.I.), average particle diameter of titanium trichloride (Dc) and bulk density of resulting polymer (f) represent the following.

a: weight of resulting polymer per 1 g of the titanium trichloride catalytic component in unit hour (hr) and at unit pressure (atm) (gPP/g Cata.hr.atm)

$$H.I.: \frac{\text{weight of polymer insoluble in boiling n-heptane}}{\text{weight of solid polymer}}$$

Dc: Average particle diameter of the titanium trichloride catalytic component calculated by averaging the measuring values which are obtained by measurement of particle diameter per 50 particles by means of microscope ($\mu$)

$\rho$: bulk density of polymer insoluble in boiling heptane, which is measured by A or B method in ASTM-D-1895-69 (g/ml).

EXAMPLE 1

Preparation of the titanium trichloride catalytic component

Inside of a four neck separable flash of 2 l inside volume equipped with stirrer was replaced with dry nitrogen, and 105 ml of mixed solvent consisting of monochlorobenzene and n-hexane, wherein 50 volume % of monochlorobenzene is blended, was introduced into the flask, further followed by blending 70 ml of titanium tetrachloride (which corresponds to 40 Volume % of titanium tetrachloride). Then the reaction mixture was kept at 0° C. under stirring.

On the other hand, dilute solution of diethyl aluminum chloride, wherein 80 ml of diethyl aluminum chloride (molar ratio of diethyl aluminium chloride to titanium tetrachloride corresponds to 1.05) was dissolved in 240 ml of mixed solvent consisting of monochlorobenzene and n-hexane in which 50 volume % of monochlorobenzene was mixed, was added dropwise over period of 4 hours under stirring into a flask whose inside was kept at 0° C.

After adding of diethyl aluminum chloride dilute solution, the reaction mixture was heated up to 65° C., kept at 65° C. for 2 hours and left alone to be cooled till room temperature in order to complete the reduction of titanium tetrachloride. The resultant reduced solid was separate by filtration and was washed with n-hexane. Thereafter, the solid was again introduced into a flask together with 600 ml of n-hexane, and thereto 90 ml of di-isoamyl ether was added dropwise over period of 1 hour.

After adding of the ether, the reaction mixture was heated up to 70° C., and was subjected to the treatment with di-isoamyl ether at 70° C. for 2 hours. After the treatment with di-isoamyl ether, the treated solid was recovered by filtration and washing. The recovered solid was again suspended into 100 ml of n-hexane in the flask and thereto 60 ml of titanium tetrachloride was added dropwise over period of 30 minutes. Subsequently, the inside of flask was heated up to 70° C. and was treated at 70° C. for 2 hours.

Thereafter, by carrying out filtering, washing and drying, the titanium trichloride catalytic component, which was spherical particle of excellent uniformity and whose average particle diameter was approximately 7$\mu$, was obtained.

Polymerization of Propylene

Into an autoclave having inside volume of 5 l whose inside was replaced with dry nitrogen gas, 50 ml of the titanium trichloride catalytic component obtained by the above preparation process, 1 ml of diethyl aluminum monochloride and 2 Kg of liquid propylene were charged in atmosphere of dry nitrogen gas, and further 5 m mol of hydrogen gas was introduced therein. Then, inside temperature of the autoclave was raised up to 70° C. by heating thereof. Following this, polymerization of propylene was carried out for 4 hours, keeping the inside temperature of the autoclave at 70° C.

After completion of the polymerization reaction, propylene gas remaining in the autoclave was purged out, and 100 ml of isopropyl alcohol was poured thereinto to decompose the titanium trichloride catalytic component. Suspension of resultant polymer was filtered and the obtained filtered cake was dried under reduced pressure to give 544 g of dried solid polymer. The dried solid polymer was subjected to extraction process with boiling n-heptane for 18 hours by means of Soxhlet extractor to separate polymer insoluble in boiling n-heptane and polymer soluble therein.

EXAMPLE 2–5

Except that composition of mixed solvent consisting of monochlorobenzene and n-heptane was changed to one in Table 1, the titanium trichloride catalytic component was prepared and propylene was polymerized thereby in the quite same process as in Example 1. The result was shown in Table 1.

TABLE 1

| Number of examples | Preparation of catalytic component Concentration of monochlorobenzene (volume %) | Result of polymerization | | | |
|---|---|---|---|---|---|
| | | Dc | a | H.I. | ρ |
| 1 | 50 | 7 | 85 | 96 | 0.51 |
| 2 | 1 | 38 | 101 | 95 | 0.50 |

TABLE 1-continued

| Number of examples | Preparation of catalytic component Concentration of monochlorobenzene (volume %) | Result of polymerization | | |
|---|---|---|---|---|
| | | Dc | a | H.I. | p |
| 3 | 25 | 15 | 93 | 95 | 0.49 |
| 4 | 75 | 5 | 89 | 96 | 0.50 |
| 5 | 100 | 2 | 96 | 96 | 0.50 |

EXAMPLE 6-9

Except that mixed solvent of toluene and n-hexane was employed instead of the mixed solvent of monochlorobenzene and n-hexane, the titanium trichloride catalytic component was prepared and propylene was polymerized thereby, in the quite same process as in example 1-5.

The result was shown in Table 2

TABLE 2

| Number of examples | Preparation of catalytic component Concentration of toluene (volume %) | Result of polymerization | | | |
|---|---|---|---|---|---|
| | | Dc | a | H.I. | p |
| 6 | 25 | 14 | 99 | 94 | 0.47 |
| 7 | 50 | 6 | 97 | 96 | 0.52 |
| 8 | 75 | 4 | 88 | 95 | 0.51 |
| 9 | 100 | 2 | 91 | 93 | 0.49 |

EXAMPLE 10-13

Except that mixed solvent of benzene and n-hexane was employed instead of the mixed solvent of monochlorobenzene and n-hexane, the titanium trichloride catalytic component was prepared and propylene was polymerized thereby, in the quite same process as in example 1-5.

The result was shown in Table 3.

TABLE 3

| Number of example | Preparation of catalytic component Concentration of benzene (volume %) | Result of polymerization | | | |
|---|---|---|---|---|---|
| | | Dc | a | I.I. | p |
| 10 | 25 | 15 | 81 | 96 | 0.52 |
| 11 | 50 | 11 | 92 | 93 | 0.48 |
| 12 | 75 | 3 | 90 | 94 | 0.48 |
| 13 | 100 | 1 | 98 | 94 | 0.51 |

EXAMPLE 14-17

Except that mixed solvent of monochlorobenzene and n-heptane was employed instead of the mixed solvent of monochlorobenzene and n-hexane, the titanium catalytic component was prepared and propylene was polymerized thereby, in the quite same process as in example 1-5.

The result was shown in Table 4.

TABLE 4

| Number of examples | Preparation of catalytic component Concentration of monochlorobenzene (volume %) | Result of polymerization | | | |
|---|---|---|---|---|---|
| | | Dc | a | I.I. | p |
| 14 | 1 | 41 | 111 | 95 | 0.52 |
| 15 | 25 | 18 | 94 | 95 | 0.50 |
| 16 | 50 | 7 | 89 | 95 | 0.50 |
| 17 | 75 | 4 | 90 | 95 | 0.49 |

We claim:

1. A titanium trichloride catalytic component prepared by a process comprising the steps of:

reducing titanium tetrachloride with an organoaluminum compound represented by the general formula $AlR_nX_{3-n}$, wherein R represents a hydrocarbon radical having 1 to 18 carbon atoms, X represents a halogen atom and n is a number represented by the formula $0 < n \leq 3$;

treating the resultant reduced solid with an organic ether compound; and reacting the treated solid with titanium tetrachloride; the reducing reaction being carried out in a mixed solvent composed of (1) an aliphatic hydrocarbon and (2) an aromatic hydrocarbon or halogenated aromatic hydrocarbon.

* * * * *